000
United States Patent [19]

Satterwhite et al.

[11] 4,065,403
[45] Dec. 27, 1977

[54] TALL OIL DEFOAMER HAVING A NONIONIC ADDITIVE DEFOAMER FOR HIGH STRENGTH ACID MEDIA

[75] Inventors: William A. Satterwhite, Englishtown; Robert M. Leach, Cranbury; Harold A. Stuhler, Browns Mills, all of N.J.

[73] Assignee: Cities Service Company, Tulsa, Okla.

[21] Appl. No.: 696,242

[22] Filed: June 15, 1976

[51] Int. Cl.² .............................................. B01D 17/04
[52] U.S. Cl. ..................................... 252/358; 252/321
[58] Field of Search .............................. 252/358, 321

[56] References Cited

U.S. PATENT DOCUMENTS

| | | | |
|---|---|---|---|
| 3,086,944 | 4/1963 | Wedell | 252/321 |
| 3,215,635 | 11/1965 | Liebling et al. | 252/358 |
| 3,238,142 | 3/1966 | Perry | 252/358 |
| 3,264,214 | 8/1966 | Stratton | 252/321 |
| 3,751,373 | 8/1973 | Lieberman et al. | 252/321 |

*Primary Examiner*—Benjamin R. Padgett
*Assistant Examiner*—E. Suzanne Parr
*Attorney, Agent, or Firm*—John W. Carpenter; Donald L. Traut

[57] ABSTRACT

A defoamer for controlling the foam in high strength acid media and process for preparing same having a majority of a sulfonated tall oil and a minority of a nonionic additive.

47 Claims, No Drawings non-sulfonated oleic acid and non-sulfonated resin acid to be admixed with the nonionic additive, find similar results in all cases.

EXAMPLE 5

Repeat Examples 1-4, but vary the mixing ratios of $SO_3$ to the selected compound (fatty acid, resin acid, or tall oil) in 0.005 increments between 0.025 and 0.600 and find similar results.

EXAMPLE 6

Repeat Examples 1-5 but vary the procedure in accordance with the following: vary the amount of the nonionic additive in increments of 0.5 wt% between about 0.10 wt% to about 50 wt% of the defoamer; vary the type of surfactant utilizing the formula R—O (R'—O)$_n$R" where R' is a hydrocarbyl, R and R" is hydrocarbyl or hydroxyhydrocarbyl, $n$ is from 1 to about 200: vary $n$ in increments of 1, vary the hydrocarbonyl, the hydrocarbyl, the hydroxyhydrocarbyl in 1 carbon atom increments between 1 carbon atom to about 50 carbon atoms; use nonylphenoxypoly (ethyleneoxy) ethanol or polyoxyethylene (2) oleyl ether as the additive, all belonging to the family of compounds called alkoxypoly (ethyleneoxy) ethanols or generally derivatives of ether, ethylene oxide. Find similar results.

EXAMPLE 7

Repeat Examples 1-6 but vary the sulfonation temperature when sulfonating in increments of 5° F between −20° and 212° F and find similar results.

EXAMPLE 8

Repeat Examples 1-6 but vary the mixing ratio of the nonionic additive to the sulfonated compound in increments of 0.005 between 0.025 and 0.750 and find similar results.

EXAMPLE 9

Repeat Examples 1-8 but vary the mixing ratio of the $SO_3$ to $SO_2$ when sulfonating in increments of 1:1 between 1:1 to 1:10 and find similar results.

EXAMPLE 10

Repeat Examples 1-9 but lower the reaction time of $SO_3$ and $SO_2$, and the agitation time of sulfonated compound and alcohol to 15 minutes and find similar results.

EXAMPLE 11

Repeat Examples 1-10 but vary $n$ in increments of 1 between 1 to 38 in the fatty acid having the formula $C_nH_{2n+1}COOH$, in the fatty acid having the formula $C_nH_{2n-1}COOH$, in the fatty acid having the formula $C_nH_{2n}O_2$, in the fatty acid having the formula $C_nH_{2n-1}COOH$ or $C_nH_{2n-3}COOH$ or $C_nH_{2n-4}O_2$ or $C_nH_{2n-5}COOH$ or $C_nH_{2n-6}O$, find similar results in all cases.

EXAMPLE 12

Admixed the fatty acid of Example 11 (and repeat Examples 1-10) with resin acid, vary the wt% of resin acid in the fatty acid in increments of 5wt% between 0.1 wt% to 99.9 wt% and find similar results in all cases.

EXAMPLE 13

Take the sulfonated tall oil of EXAMPLE 1 and the nonionic additive of EXAMPLE 1 and test the defoamer requirements of each and synergistically compare with the defoamer of EXAMPLE 1. Find the following synergistic results:

Table 2

| | Defoamer Requirements per ton $P_2O_5$ | Cost per ton $P_2O_5$ ($) |
|---|---|---|
| Sulfonated tall oil | 7.52 | 1.88 |
| Nonionic Additive | 6.03 | 1.20 |
| Applicants' Defoamer | 2.62 | .48 |

EXAMPLE 14

Repeat EXAMPLE 13 in accordance with each procedure of EXAMPLES 2-12 and find the similar results given in EXAMPLE 13.

While the present invention has been described herein with reference to particular embodiments thereof, and specific examples, a latitude of modifications, various changes and substitutions are intended in the foregoing disclosure, and in some instances some features of the invention will be employed without a corresponding use of other features without departing from the scope of the invention as set forth.

We claim:

1. A defoamer for controlling the foam in high strength acid media comprising a majority of a sulfonated fatty acid and a minority of a nonionic additive having the formula R—O(R'—O)$_n$R" [R-O(R')$_n$R"] wherein R' is hydrocarbyl [alkylene oxide], R and R" is hydrocarbonyl or hydroxyhydrocarbyl, and $n$ is an integer of from 1 to about 200.

2. The defoamer of claim 1, wherein said fatty acid comprises a formula of $C_nH_{2n+1}$COOH where $n$ is an integer of from 1 to 38.

3. The defoamer of claim 1 wherein said fatty acid includes at least one double bond and comprises a formula of $C_nH_{2n-1}$COOH where $n$ is an integer of from 10 to 30.

4. The defoamer of claim 3 wherein said fatty acid additionally comprises resin acid.

5. The defoamer of claim 4 wherein said resin acid comprises a majority of abietic acid having the formula $C_{20}H_{30}O_2$.

6. The defoamer of claim 5 wherein said fatty acid and resin acid mixture comprises from about 0.1 wt% to about 99.9 wt% of said resin acid.

7. The defoamer of claim 6 wherein said fatty acid comprises oleic acid having the formula $C_{18}H_{34}O_2$.

8. The defoamer of claim 1, wherein said fatty acid is sulfonated and comprises a sulfonation ratio of $SO_3$ to fatty acid of from approximately 0.025:1 to about 0.6:1.

9. The defoamer of claim 8 wherein said nonionic additive is polyoxyalkene alkyl ether wherein the polyoxy alkene group comprises from about 2 to about 10 carbon atoms and the alkyl radical includes from about 1 to about 18 carbon atoms.

10. The defoamer of claim 9 wherein said polyoxyalkene alkyl ether is polyoxyethylene (2) oleyl ether.

11. The defoamer of claim 1 wherein said nonionic additive is hydrocarbyloxy poly (alkeneoxy) alcohol wherein the hydrocarbyloxy group has from about 1 to about 50 carbon atoms, the alkeneoxy group has from about 2 to about 10 carbon atoms, and the alcohol has from about 1 to about 10 carbon atoms.

12. The defoamer of claim 11 wherein said additive is selected from the group consisting of tridecyloxy-poly (ethyleneoxy) ethanol and octylphenoxypoly (ethyleneoxy) ethanol.

13. The defoamer of claim 11 wherein the hydrocarbyloxy group is selected from the group consisting of hydroxy anthracene, hydroxy naphthalene, and hydroxy phenyl.

14. The defoamer of claim 11 wherein said nonionic additive comprises from about 0.10 wt% to about 50 wt% of said defoamer.

15. The defoamer of claim 8, wherein said fatty acid is sulfonated at a temperature of from between about −20° to about 212° F.

16. The defoamer of claim 15, wherein said ratio of said nonionic additive to said sulfonated fatty acid is from approximately 0.25:1 to about 0.750:1.

17. The defoamer of claim 8, wherein said $SO_3$ additionally comprises $SO_2$, said mixture of $SO_3$ and $SO_2$ being mixed in a ratio of from approximately 1:1 to about 1:10.

18. A process for preparing a defoamer for controlling the foam in high strength acid media comprising mixing a majority of a sulfonated fatty acid and a minority of a nonionic additive having the formula R—O(R'—O)$_n$R" [R-O(R' )$_n$R"] wherein R' is hydrocarbyl [alkylene oxide], R and R" is hydrocarbyl or hydroxyhydrocarbyl, and $n$ is an integer of from 1 to about 200.

19. The process of claim 18 wherein said fatty acid comprises a formula of $C_nH_{2n+1}$COOH where $n$ is an integer of from 1 to 38.

20. The process of claim 18 wherein said fatty acid includes at least one double bond and comprises a formula of $C_nH_{2n-1}$COOH were $n$ is an integer of from 10 to 30.

21. The process of claim 20 wherein said fatty acid additionally comprises resin acid.

22. The process of claim 21 wherein said resin acid comprises a majority of abietic acid having the formula $C_{20}H_{30}O_2$.

23. The process of claim 22 wherein said fatty acid and resin acid mixture comprises from about .1 wt% to about 99.9 wt% of said resin acid.

24. The process of claim 23 wherein said fatty acid comprises oleic acid having the formula $C_{18}H_{34}O_2$.

25. The process of claim 18 wherein said nonionic additive is polyoxyalkene alkyl ether wherein the polyoxyalkene group comprises from about 2 to about 10 carbon atoms and the alkyl radical includes from about 1 to about 18 carbon atoms.

26. The process of claim 25 wherein said polyoxyalkene alkyl ether is polyoxyethylene (2) oleyl ether.

27. The process of claim 18 wherein said nonionic additive is hydrocarbyloxy poly (alkeneoxy) alcohol wherein the hydrocarbyloxy group has from about 1 to about 50 carbon atoms, the alkeneoxy group has from about 2 to about 10 carbon atoms, and the alcohol has from about 1 to about 10 carbon atoms.

28. The process of claim 27 wherein said additive is selected from the group consisting of tridecyloxypoly (ethyleneoxy) ethanol and octylphenoxypoly (ethyleneoxy) ethanol.

29. The process of claim 27 wherein the hydrocarbyloxy group is selected from the group consisting of hydroxy anthracene, hydroxy naphthalene, and hydroxy phenyl.

30. The process of claim 18 wherein said nonionic additive comprises from about 0.10 wt% to about 50 wt% of said defoamer.

31. The process of claim 18, wherein said fatty acid is sulfonated and comprises a sulfonation ratio of $SO_3$ to fatty acid of from approximately 0.025:1 to about 0.6:1.

32. The process of claim 31 additionally including mixing $SO_2$ with said $SO_3$, said mixture of $SO_3$ and $SO_2$ being mixed in a ratio of from approximately 1:1 to about 1:10.

33. The process of claim 32, wherein said sulfonation is performed at a temperature of between about −20° F. tp about 212° F.

34. The process of claim 33, wherein said mixture of fatty acid, $SO_3$, and $SO_2$, is allowed to react for at least 15 minutes.

35. The process of claim 34, wherein the ratio of said nonionic additive to said sulfonated fatty acid is from approximately 0.025:1 to about 0.750:1.

36. The process of claim 33 additionally comprising agitating said mixture of sulfonated fatty acid and nonionic additive for at least 15 minutes immediately after adding said nonionic additive to insure complete dispersion of the acid sludge resulting from sulfonation of the fatty acid.

37. A defoamer for controlling the foam in high strength acid media comprising a majority of a sulfonated tall oil and a minority of a nonionic additive having the formula R—O(R'—O)$_n$R" [R-O(R')$_n$R"]wherein R' is hydrocarbyl [alkylene oxide], R and R" is hydrocarbyl or hydroxyhydrocarbyl, and $n$ is an integer of from 1 to about 200.

38. The defoamer of claim 37 wherein said tall oil comprises a sulfonation ratio of $SO_3$ to tall oil of from approximately 0.025:1 to about 0.6:1.

39. The defoamer of claim 37 wherein said nonionic additive is polyoxyalkene alkyl ether wherein the polyoxyalkene group comprises from about 2 to about 10 carbon atoms and the alkyl radical includes from about 1 to about 18 carbon atoms.

40. The defoamer of claim 39 wherein said polyoxyalkene alkyl ether is polyoxyethylene (2) oleyl ether.

41. The defoamer of claim 37 wherein said nonionic additive is hydrocarbyloxy poly (alkeneoxy) alcohol wherein the hydrocarbyloxy group has from about 1 to about 50 carbon atoms, the alkeneoxy group has from about 2 to about 10 carbon atoms, and the alcohol has from about 1 to about 10 carbon atoms.

42. The defoamer of claim 41 wherein said additive is selected from the group consisting of tridecyloxypoly (ethyleneoxy) ethanol and octylphenoxypoly (ethyleneoxy) ethanol.

43. The defoamer of claim 41 wherein the hydrocarbyloxy group is selected from the group consisting of hydroxy anthracene, hydroxy naphthalene, and hydroxy phenyl.

44. The defoamer of claim 37 wherein said nonionic additive comprises from about 0.10 wt.% to about 50 wt% of said defoamer.

45. The defoamer of claim 38, wherein said tall oil is sulfonated at a temperature of from between about −20° F to about 212° F.

46. The defoamer of claim 45 wherein said ratio of said nonionic additive to said sulfonated tall oil is from approximately 0.025:1 to about 0.750:1.

47. The defoamer of claim 38, wherein said $SO_3$ additionally comprises $SO_2$, said mixture of $SO_3$ and $SO_2$ being mixed in a ratio of from approximately 1:1 to about 1:10.

* * * * *

TALL OIL DEFOAMER HAVING A NONIONIC ADDITIVE DEFOAMER FOR HIGH STRENGTH ACID MEDIA

BACKGROUND OF THE INVENTION

1. Field of the Invention

The invention is related to a surface active material, a defoamer. More particularly, this invention provides a defoamer and process for preparing same which controls the foam in high strength acid media from petroleum products.

2. Description of the Prior Art

Defoamers consist of sulfonated tall oil-fatty acids. Some are produced from a refined oleic acid while others are produced from tall oil. The primary application of these defoamers is in the phosphate industry to control the foam in the digestion and concentration stages of wet-process phosphoric acid manufacture. In recent years cost of defoamers has drastically increased because of the high cost of raw materials utilized in their manufacture. Therefore, what is needed and what has been invented by us is a novel defoamer which is not only low in cost but is also more effective than the conventional defoamers being marketed.

SUMMARY OF THE INVENTION

It is therefore an object of this invention to provide a defoamer and a process for preparing same.

It is yet another object of this invention to provide a defoamer which is economical to prepare and is more effective than conventional defoamers.

These and other objects will become apparent to those skilled in the art as the following description proceeds.

The foregoing objects are achieved in accordance with this invention. Broadly, this invention is a defoamer and process for preparing same for controlling the foam in high strength acid media from petroleum products which comprises a majority of a sulfonated tall oil and/or fatty acid and a majority of a nonionic additive.

DETAILED DESCRIPTION OF THE INVENTION

The composition of matter of this invention is a defoamer for controlling the foam in high strength acid media which broadly comprises a majority of either a fatty acid, or a resin acid, or a tall oil and a minority of a nonionic additive. The fatty acid may be mixed with resin acid. The mixture, generally known as tall oil (a by product from sulfate woodpulp digestion consisting mainly of resin acids and fatty acids), may contain from about 0.1 wt% to about 99.9 wt% of the resin acid. Therefore, the defoamer may also broadly comprise a majority of a resin, which preferably has been sulfonated, and a minority of nonionic additive. If the fatty acid or the resin acid is going to be utilized alone, in a preferred embodiment of the invention, the fatty acid is the most preferred.

As was previously mentioned, tall oil is the natural mixture of resin acids and of fatty acids (together with nonacetic compounds) which is obtained by acidifying the black liquor skimmings of the alkaline paper industry. Crude tall oil is refined by solvent extraction and/or distillation. The more refined the product, the higher the fatty acid content as shown in the following:

| Product | Fatty Acid (%) | Resin Acids (%) | Unsaponified (%) |
| --- | --- | --- | --- |
| Crude Tall Oil | 18 | 28 | 54 |
| Single Distilled | 90 | 6.5 | 2.7 |
| Double Distilled | 99 | 0.5 | 0.4 |

Tall oil by-products, such as tall oil heads and tall oil pitch, are also used as defoamers. Heads contain about 74.5 wt.% fatty acid, 25 wt.% resin acids, and 0.5 wt% unsaponified. Pitch contain approximately 34.0 wt% fatty acid, 36 wt.% resin acid, and 25.0 wt% unsaponified. These products are obtained from the still bottoms (crudes left over after refinement), and etc. The fatty acids are usually present as terpenes, esters; they can be either natural or synthetic, and may also be substituted with hydroxy or keto groups.

Fatty acids are a large group of organic, monobasic acids derived from hydrocarbons and may be saturated or unsaturated. In a preferred embodiment of the invention, the fatty acids are a large group of aliphatic monocarboxylic acid. The saturated fatty acids (e.g. formic, acetic, palmitic, stearic, etc.) have the emperial formula $C_nH_{2n+1}COOH$ where $n$ is an integer of from 1 to 38, or $C_nH_{2n}O_2$ where $n$ may have the same range of values. The unsaturated fatty acids have at least one double bond and may have the following emperical formulas: $C_nH_{2n-1}COOH$ or $C_nH_{2n-3}COOH$, or $C_nH_{2n-4}O_2$ (acetylene acids, sorbic acid, linoleic acid, oleic etc); and $C_nH_{2n-5}COOH$ or $C_nH_{2n-6}O$ (linolinic acid, etc).

In the foregoing emperical formulas for unsaturated acids $n$ may be between 2 and 40, more preferably $n$ is between 10 and 30.

Resins are the oxidation or polymerization products of the terpenes, and consist of mixtures of aromatic acids and esters which are insoluble in water, soluble in alcohol, ether or essential oils. Rosin is the resin remaining after distilling turpentine from the exudation of various species of pines (e.g. pinus palustris). It contains from about 80 to 90 wt.% of abietic acid ($C_{20}H_{30}O_2$) and its anhydride.

The fatty acid, resin acid or tall oil is sulfonated by mixing it with a mixture of $SO_3$ and $SO_2$ at a temperature of between about $-20°$ F and $212°$ F. A preferred temperature is room temperature (i.e. about $72°$ F). The $SO_3$ is much too reactive alone; therefore, $SO_2$ is utilized to pacify the reaction. The $SO_2$ doesn't enter into the reaction of the $SO_3$ and oil but merely acts as a diluent and coolant for the strong oxidizing tendencies of the $SO_3$. The nonionic additive is used to disperse and/or dissolve the acid sludge. The nonionic additive not only disperses the sludge but also permits the formation of a synergistic product to produce a defoamer which is several fold more effective than the fatty acid, resin acid, tall oil or the sulfonate of these compounds or the nonionic additive alone.

The nonionic additive preferably has the formula $R-O(R'-O)_nR''$ wherein $R'$ is a alkylene oxide hydrocarbyl, $R$ and $R''$ is either a hydrocarbyl or hydroxyhydrocarbyl, and $n$ is an integer of from 1 to about 200. More preferably the nonionic additive is polyoxyalkene alkyl ether or hydrocarbyloxy poly (Alkeneoxy) alcohol, wherein the polyoxyalkene group has from about 2 to about 10 carbon atoms, the alkyl radical includes from about 1 to about 16 carbon atoms, the hydrocarbyloxy group contains from about 1 to about 50 carbon atoms and is preferably selected from the group consisting of hydroxyanthracene hydroxy naphthalene and hydroxy phenyl, the alkeneoxy group has from about 2 to about 10 carbon atoms, and the alcohol comprises from about 1 to about 10 carbon atoms. Most preferably the nonionic additive is selected from the group consisting of tridecyloxypoly (ethyleneoxy) ethanol and octylphenoxypoly (ethyleneoxy) ethanol. The nonionic additive preferably comprises from about 0.10 wt % to about 50 wt% of the defoamer; more preferably the defoamer has from about 1 to about 8 wt% of the additive; more preferably the defoamer comprises about 4 wt% of the additive.

The sulfonation ratio of $SO_3$ to either fatty acid resin acid or tall oil may broadly be from about 0.025:1 to about 0.60:1. The more preferred sulfonation ratio of $SO_3$ to anyone of these compounds is from between about 0.1:1 to about 0.3:1, most preferably, the ratio is about 0.25:1.

In the process for preparing the defoamer the fatty acid, or the resin acid, or the tall oil is preferably sulfonated with a minority of $SO_3$ dissolved in a majority of $SO_2$. The mixing ratio of $SO_3$ to $SO_2$ may be any suitable ratio such that $SO_2$ quiesces the reactive $SO_3$. Preferably $SO_3$ and $SO_2$ are mixed in a ratio of from approximately 1:1 to about 1:10. During the course of the reaction of either the fatty acid, the resin acid, or the tall oil and the $SO_3$, $SO_2$ mixture, the temperature decreases. The mixture is preferably allowed to react from between about 15 minutes and 90 minutes whereafter the reacted product is a mixture of sulfonated fatty acid, a sulfonated resin acid, or a sulfonated tall oil (depending on starting compound), and an acid sludge. The nonionic additive is subsequently added to the sulfonated compound to disperse the sludge. After the admixing of the nonionic additive to the sulfonated compound, the mixture is blended from between about 15 mins. and 90 minutes. It should be noted that the 90 minute upper limitation on the reaction time of the compound and $SO_3$, $SO_2$ mixture, and the sulfonated compound and nonionic additive mixture is not to be construed as an unduly limitation. Longer reaction times would be superfluous because the reactions are completed after about 15 minutes.

In the following is set forth examples of our invention which are given by way of illustrations and not by limitations. The specific concentrations, temperatures, times, compounds, etc., set forth in these examples are not to be construed to unduly limit the scope of the invention.

EXAMPLE 1

Four hundred grams of refined tall oil containing 90% wt. fatty acids of which about 60% wt. was oleic acid and about 30% wt. was linoleic acid were sulfonated at room temperature with 130 gms of liquid $SO_3$ dissolved in 680 gms of liquid $SO_2$. During the course of the reaction, the temperature decreased to 20° F. The mixture was allowed to react for 30 minutes at which time the temperature rose to 70° F. The product was then heated to 140° F for 30 minutes to strip residual $SO_2$. The reacted product was a mixture of sulfonated tall oil and sludge. About 21 grams of tridecyloxypoly (ethyleneoxy) ethanol were added to the mixture to disperse the sludge. The mixture was blended for 15 minutes at 140° F. to insure complete dispersion of the sludge. An acceptable alternative is to add the nonionic additive along with the tall oil before sulfonation. The product was then neutralized to pH7 with caustic.

Water was added to neutralized sulfonate to produce a product containing about 40% sulfonate. Neutralization is not absolutely necessary in the preferred embodiment of the invention but is preferred for shipping purposes.

This defoamer was added periodically to a reactor having a continuous flow of phosphate rock, 60% $H_2SO_4$, and recycled phosphoric acid (25% $P_2O_5$) in order to control the foaming. This defoamer was proved to be superior to conventional defoamers on a cost/ton of $P_2O_5$ basis and defoamer requirements/ton of $P_2O_5$ as evidenced in the following Table I:

Table I

|  | Defoamer Requirements per ton $P_2O_5$ (lbs./ton) | Cost per Ton $P_2O_5$ ($) |
|---|---|---|
| Applicants' Defoamer | 2.62 | .48 |
| Conventional Defoamers |  |  |
| Brand A | 4.00 | 0.70 |
| Brand B | 2.87 | 0.65 |
| Brand C | 4.68 | 1.24 |
| Brand D | 6.62 | 1.16 |
| Brand E | 4.18 | 6.94 |
| Brand F | 9.60 | 1.63 |
| Brand G | 4.66 | 0.98 |

EXAMPLE 2

Four hundred grams of refined tall oil containing 90% fatty acid of which about 60% wt was oleic acid and 30% wt. linoleic acid were sulfonated at room temperature with 130 grams of liquid $SO_3$ dissolved in 650 grams of liquid $SO_2$. During the course of the reaction, the temperature decreased to 10° F. The mixture was allowed to react for 30 minutes at which time the temperature rose to 85° F. The product was then heated to 120° F to strip residual $SO_2$. The reacted product was a mixture of the sulfonated tall oil and acid sludge. 21 grams of a nonionic additive, tridecyloxypoly (ethyleneoxy) ethanol was added to the product. The mixture was agitated for 30 minutes to insure a homogenous product. The mixture is then preferably neutralized to pH7 with caustic. Enough water is added to the neutralized mixture to produce a product containing about 40% sulfonate. Subsequently the defoamer was tested and compared to conventional defoamers in accordance with Example I and similar results were found.

EXAMPLE 3

One hundred grams of a tall oil product containing about 55% tall oil resins (ester) and about 40% polyterpenes were sulfonated at room temperature with 40 grams of liquid $SO_3$ dissolved in 600 grams of liquid $SO_2$. During the course of the reaction, the temperature dropped to −0° F. The mixture was allowed to react for 15 minutes at which time the temperature of the mixture rose to 60° F after which the product is heated to 120° F to flush off any residual $SO_2$. The reacted product was a mixture of sulfonated tall oil and acid sludge. 4 grams of tridecyloxypoly (ethyleneoxy) ethanol (a nonionic additive) was added to the mixture to disperse the sludge. The mixture was stirred at room temperature for 30 minutes to insure complete dispersion of the sludge. Subsequently the defoamer was tested and compared to conventional defoamers in accordance with EXAMPLE I and similar results were found.

EXAMPLE 4

Repeat Example I but substitute oleic acid for the tall oil, then substitute resin acid for tall oil, then substitute